(12) United States Patent
Lorenzen

(10) Patent No.: US 8,186,236 B2
(45) Date of Patent: *May 29, 2012

(54) ACTUATOR

(75) Inventor: Anders Berkjær Lorenzen, Åbenrå (DK)

(73) Assignee: LINAK A/S, Nordborg (DK)

( * ) Notice: Subject to any disclaimer, the term of this patent is extended or adjusted under 35 U.S.C. 154(b) by 1078 days.

This patent is subject to a terminal disclaimer.

(21) Appl. No.: 11/991,086

(22) PCT Filed: Sep. 1, 2006

(86) PCT No.: PCT/DK2006/000474
§ 371 (c)(1),
(2), (4) Date: Feb. 27, 2008

(87) PCT Pub. No.: WO2007/023550
PCT Pub. Date: Mar. 8, 2007

(65) Prior Publication Data
US 2009/0133519 A1 May 28, 2009

(30) Foreign Application Priority Data

Sep. 22, 2005 (DK) .............................. 2005 01321
Sep. 2, 2006 (DK) .............................. 2005 01222

(51) Int. Cl.
*F16H 27/02* (2006.01)
*F16H 29/02* (2006.01)
*B65H 59/10* (2006.01)
(52) U.S. Cl. ...................... 74/89.38; 74/89.39; 188/67
(58) Field of Classification Search ............... 74/89.23, 74/89.26, 89.38, 89.39, 89.42, 89.45; 403/329; 188/67, 77 W, 77 R, 199

See application file for complete search history.

(56) References Cited

U.S. PATENT DOCUMENTS

| 5,342,139 A * | 8/1994 | Hoffman | 403/327 |
| 5,836,462 A * | 11/1998 | Liljedahl | 212/260 |
| 7,849,756 B2 * | 12/2010 | Minnig et al. | 74/89.26 |

(Continued)

FOREIGN PATENT DOCUMENTS
DE 19647556 11/1996
(Continued)

OTHER PUBLICATIONS

English Abstract of DE 19950689.

(Continued)

Primary Examiner — Justin Krause
Assistant Examiner — Adam D Rogers
(74) Attorney, Agent, or Firm — Dykema Gossett PLLC

(57) ABSTRACT

Actuator of the type where a driving rod (11) is extended by a nut (10) on a driven spindle. A manually operated emergency lowering device (14) for the driving rod (11) is mounted between the driving rod (11) and a mounting bracket (16) at the end thereof. The emergency lowering device (14) comprises a first cylindrical part (15) connected with the mounting bracket (16) and a second cylindrical part (17) connected with the driving rod (11). The two cylindrical parts are coupled together by a screw spring (21). The spring is released by an operating grip (19) constructed as a bushing in which the one end (22) of the spring (21) is secured. The other end (23) of the spring (21) is secured in the cylindrical part (17) connected with the driving rod (11). Rotation of the bushing causes the spring (21) to be released, whereby the driving rod (11) may be screwed back by the manually applied torque.

10 Claims, 6 Drawing Sheets

U.S. PATENT DOCUMENTS

2004/0093969 A1* 5/2004 Nielsen .................. 74/89.23
2006/0243075 A1* 11/2006 Liou et al. ................ 74/89.39
2011/0043062 A1* 2/2011 Lorenzen ................. 310/83

FOREIGN PATENT DOCUMENTS

| DE | 19950689 | 11/2000 |
|---|---|---|
| DK | 130460 | 2/1975 |
| EP | 685662 A2 * | 12/1995 |
| EP | 1457710 | 3/2004 |
| EP | 1457710 A1 * | 9/2004 |

OTHER PUBLICATIONS

English Abstract of DE 19647556.
English Abstract of EP 1 457 710 A1.

* cited by examiner

ACTUATOR

BACKGROUND OF THE INVENTION

1. Field Of The Invention

The invention relates to a linear actuator having an emergency lowering mechanism.

2. The Prior Art

Briefly, a linear actuator consists of a spindle driven by a reversible electric motor via a transmission. A nut is provided on the spindle, to which an driving rod is secured. The spindle nut is secured against rotation and moves outwards or inwards along the spindle depending on the direction of rotation of the motor and the spindle, and the driving rod is either extended or retracted with the nut.

Depending on the structure in which the actuator is incorporated, the actuator may be equipped with a quick release function or an emergency lowering function. Quick release is typically used in actuators for hospital or nursing beds, e.g., in order to be able to lower the backrest instantaneously in the event that the patient on the bed has a heart attack or goes into a coma. Emergency lowering is typically used for actuators which are incorporated in patient lifters in order to be able to lower the patient because of a power failure. Here, it is a matter of lowering the patient as gently as possible, while with the quick release it is a matter of acting as quickly as possible in order to save lives.

The present invention relates to emergency lowering, and examples of this are known, e.g., from DE 196 47 556 A1 to Rudolf Weiner, where the driving rod is released by disconnecting a pin, whereby the driving rod when being gripped may be turned inwards by hand. In the actuator disclosed in DK 130 460 to Trioterm A/S, the driving rod is secured by a clamping bushing, and by loosening this with an operating grip, the driving rod is released. DE 199 50 689 A1 to Okin discloses a structure with two coupling parts which are spring biased for mutual engagement. When the coupling is released, the driving rod may be turned manually inwards. EP 0 789 665 (U.S. Pat. No. 5,836,462) discloses a structure with a biased friction disc where the friction is adapted such that the driving rod is secured against rotation in normal operation, but may be overcome with an outer torque, viz. by rotating a bushing, whereby the driving rod is screwed back. Finally, EP 1 457 710 A1 discloses a structure comprising a claw coupling enclosed by a screw spring which serves as a brake. Turning of the operating grip through a certain angle causes the claw coupling to be released, and the load on the mounting bracket hereby causes the spindle nut and the driving rod connected with the nut to be screwed inwards on the non-self-locking spindle, whereby the claw coupling again connects the brake spring and thereby brakes the further movement of the driving rod. In order to lower the load, the claw coupling must thus be operated several times.

The object of the invention is to provide a simplified, but reliably operating structure of an emergency lowering device.

SUMMARY OF THE INVENTION

This is achieved according to the invention by constructing the emergency lowering mechanism of the actuator to include a screw spring as a coupling spring seated tightly around the cylindrical part connected with the mounting bracket. One end of the spring is secured with a bent end in the operating grip, and the other end is secured in the cylindrical part connected with the driving rod of the actuator. With this structure, the operating grip may be configured as a simple bushing, just as a claw coupling is avoided. When the operating grip is turned, the coupling spring is released and the connection of the driving rod with the mounting bracket is interrupted. During continued turning of the operating grip, a torque is applied to the driving rod, so that it is screwed inwards on the spindle. In contrast to the structure in EP 1 457 710 A1 where it is the load on the actuator which moves the driving rod, with the invention it is the manually applied torque on bushings that screws the driving rod back. This also means that the structure in EP 1 457 710 A1 only operates when the actuator is equipped with a non-self-locking spindle. If, on the other hand, the actuator is equipped with a self-locking spindle, then the load cannot push the driving rod back, as the nut is "locked" on the spindle.

Expediently, the spring is secured to the bushing by an outwardly bent end of the spring received in a longitudinally extending groove in the bushing. This provides for easy mounting.

When the bushing is turned, the spring is stretched, whereby the torque on the bushing is transferred to the driving rod via the spring. In order not to overload the spring, the operating grip and the cylindrical part connected with the driving rod are provided with cooperating carrier means. When the spring is turned suitably so that it is certain that the spring is disconnected, the carrier means are brought into contact and transfer the further torque. In their simplest form, the carrier means may be a protruding pin on the cylindrical part on the driving rod cooperating with the edge of a recess in the operating grip. Expediently, the recess is disposed at the end of the groove for the spring.

The invention will be described more fully below with reference to the accompanying drawings.

DETAILED DESCRIPTION OF THE PREFERRED EMBODIMENTS

Figure 1:
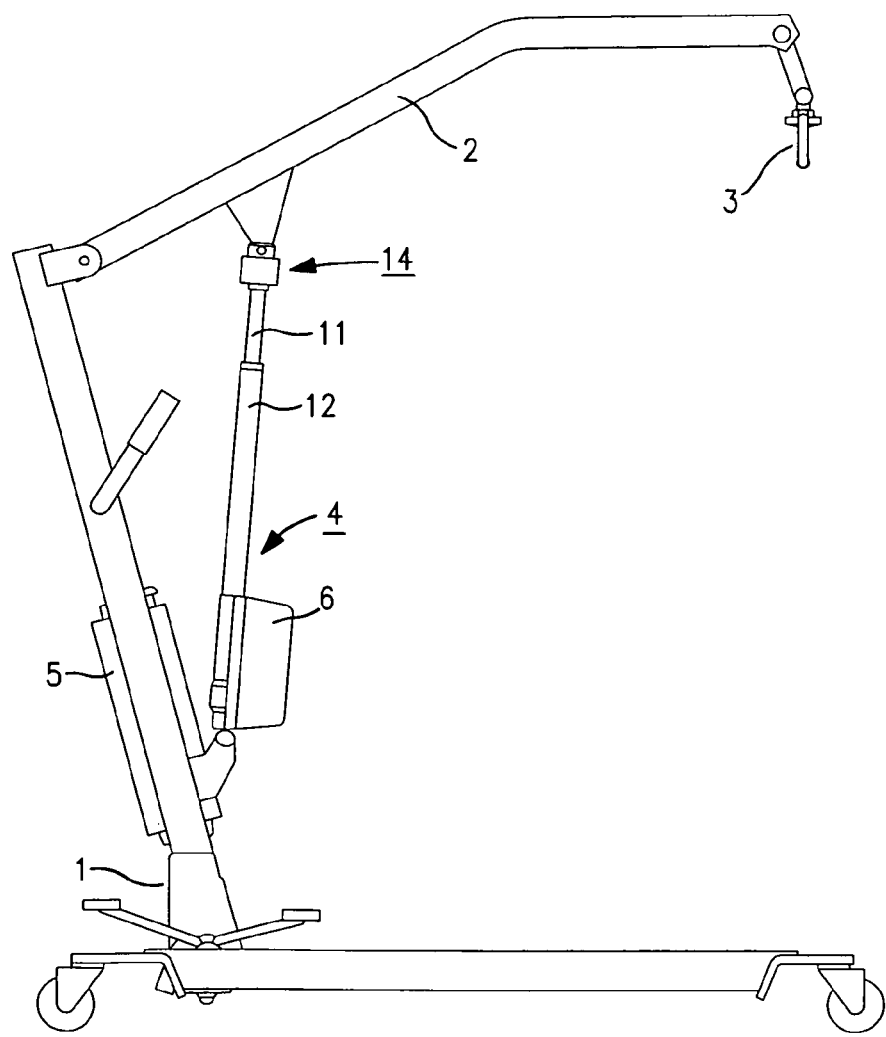
FIG. 1 shows a patient lifter seen from the side.

The patient lifter shown in FIG. 1 comprises a frame 1 provided with wheels. A bar 2, which is pivotable about a horizontal axis, is secured at one end to the frame. A lifting hook 3 for lifting a patient is secured to the other end of the bar. The bar is raised and lowered by a linear actuator 4 whose rear end is secured to the frame and whose forward end is secured to the bar. A control box 5 containing a control unit and a rechargeable battery for the operation of the actuator is mounted on the frame.

Figure 2:
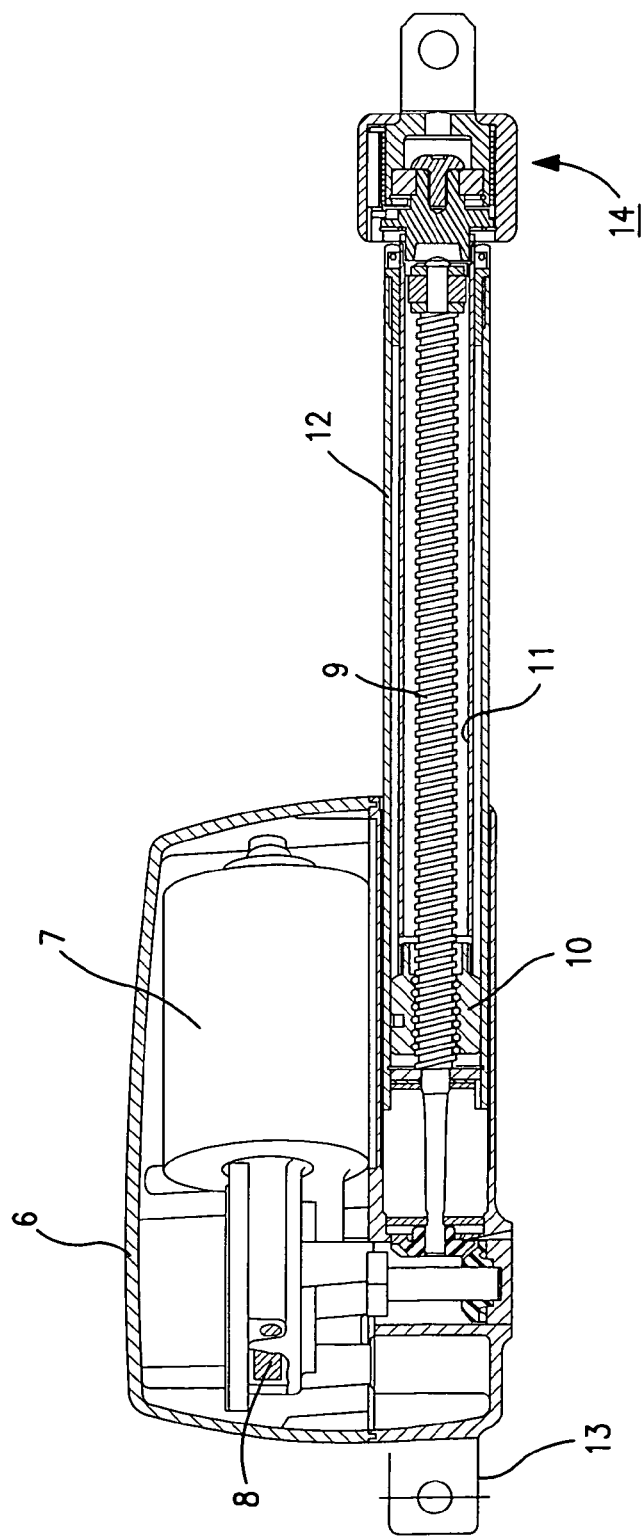
FIG. 2 shows a longitudinal section through a linear actuator device with an emergency lowering device according to the invention.

As will appear from FIG. 2, the main components of the actuator are formed by a housing 6 having a reversible electric motor 7, which over a transmission 8 drives a spindle 9 with a spindle nut 10, here a worm gear and an angular gear, the spindle having secured thereto an driving rod 11 (inner tube) telescopically mounted in a tubular part (outer tube) 12 of the housing. The housing has a rear mount 13 for securing the rear end of the actuator.

Figure 3:
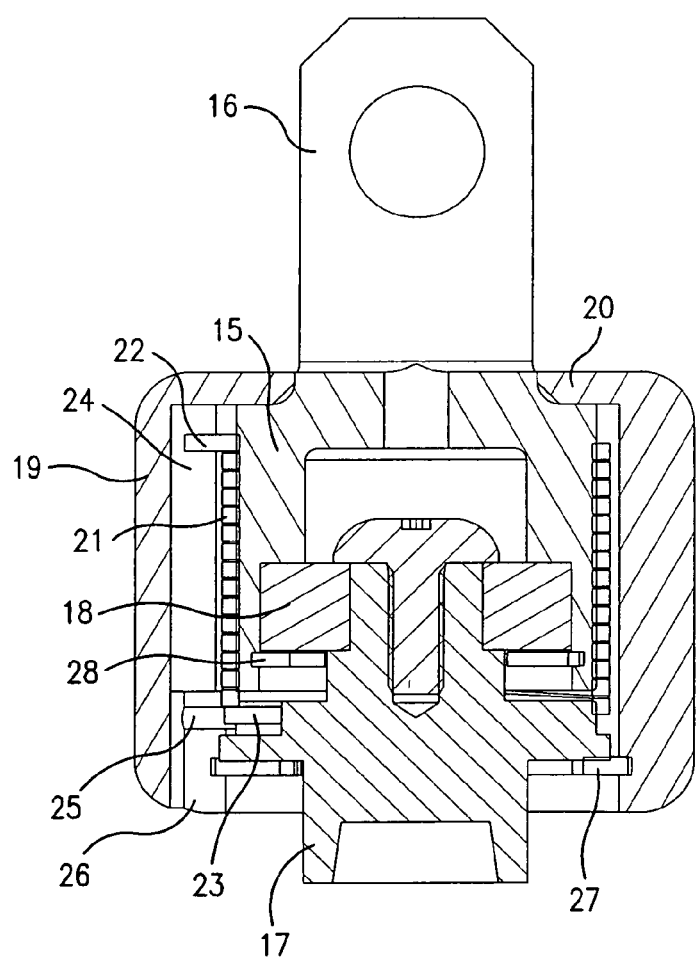
FIG. 3 shows an enlarged longitudinal section through the emergency lowering device in FIG. 2.
Figure 4:
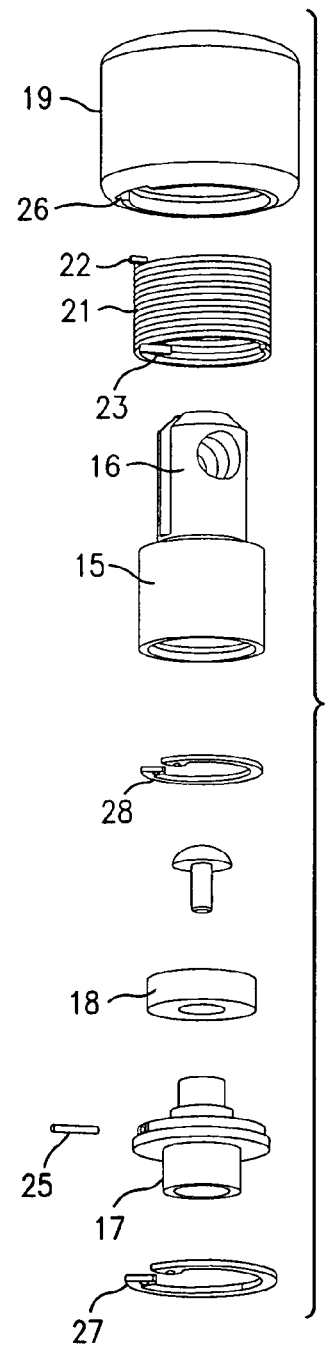
FIG. 4 shows an exploded view of the emergency lowering device of FIG. 3.
Figure 5:
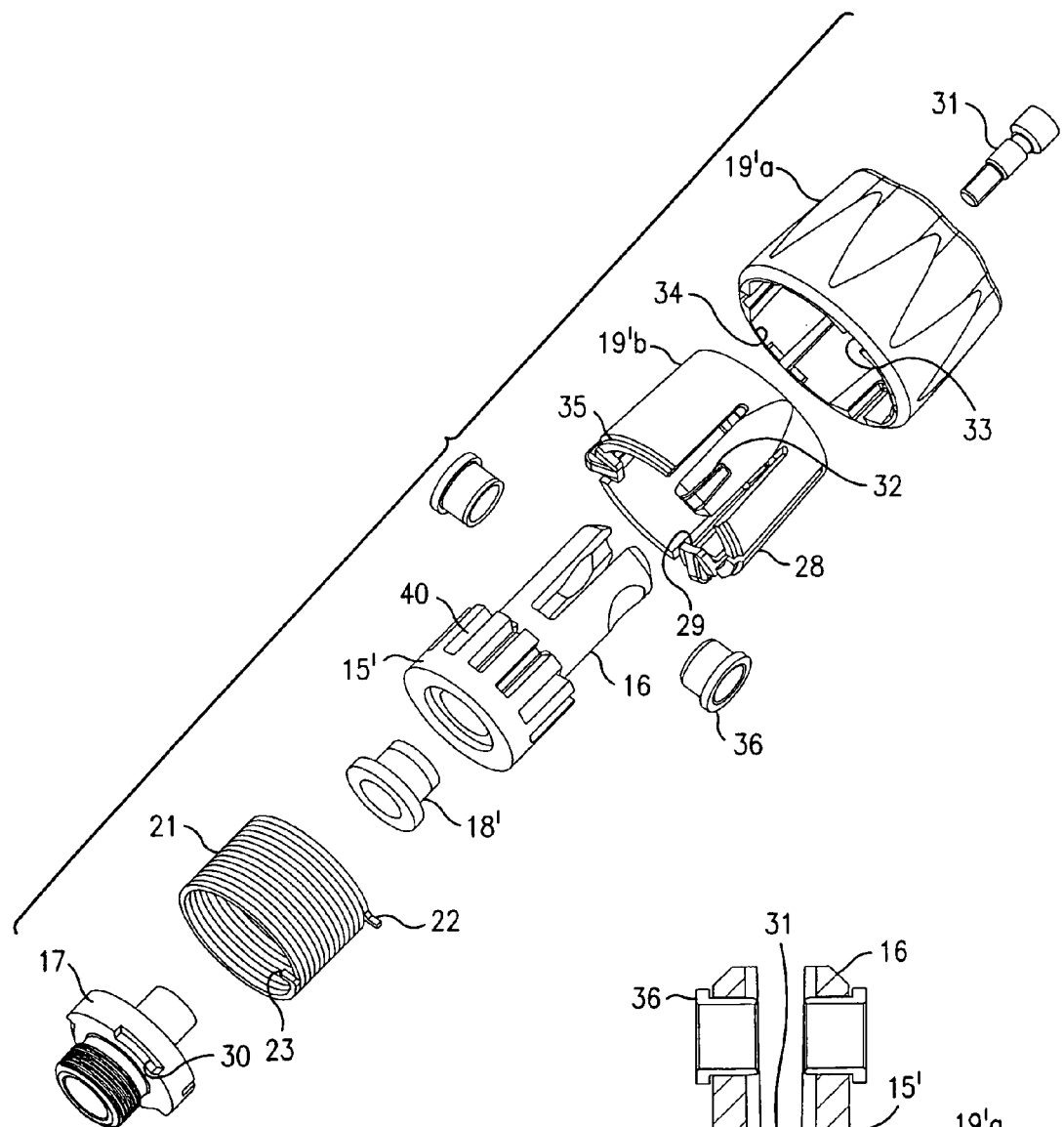
FIG. 5 shows an exploded view of a second embodiment of the emergency lowering device.
Figure 6:
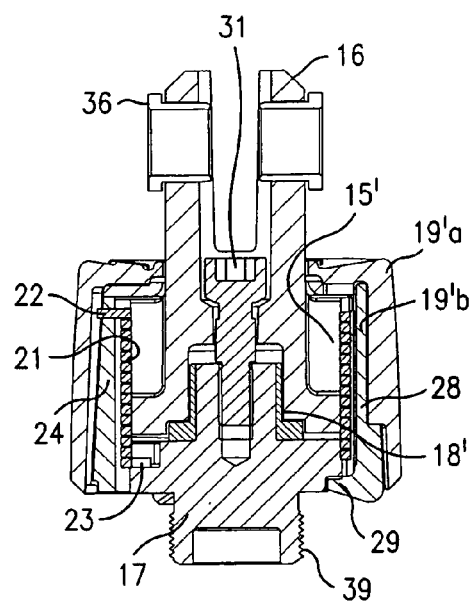
FIG. 6 shows a longitudinal section through the emergency lowering device of FIG. 5.
Figure 9:
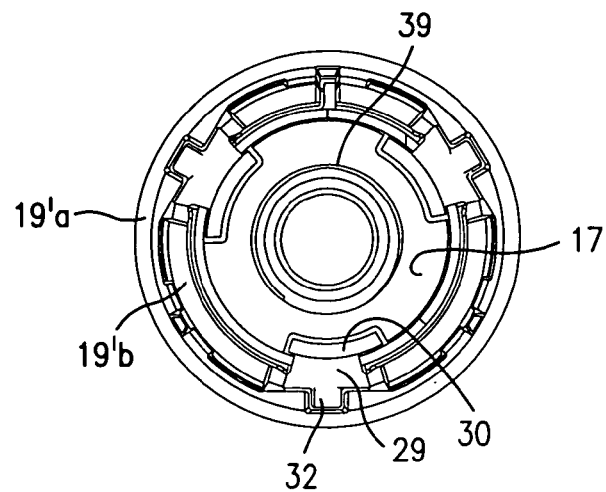
FIG. 9 shows the emergency lowering device of FIG. 6 seen from below.
Figure 7:
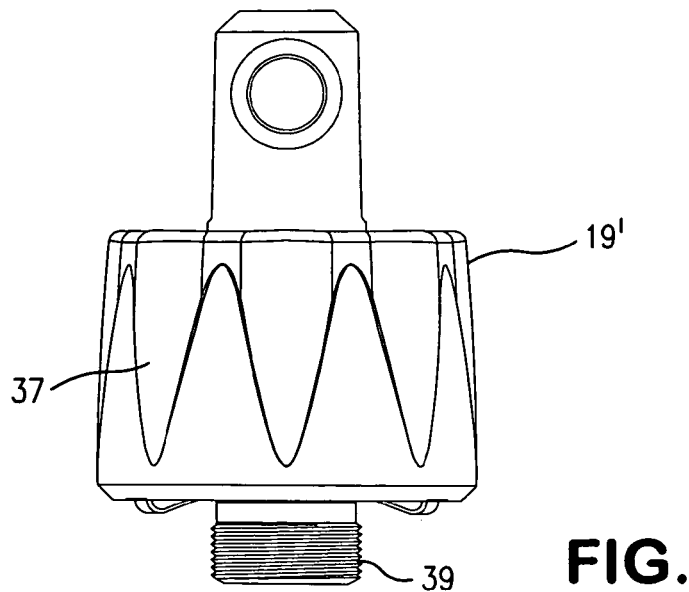
FIG. 7 shows the emergency lowering device of FIG. 6 seen from the side.
Figure 8:
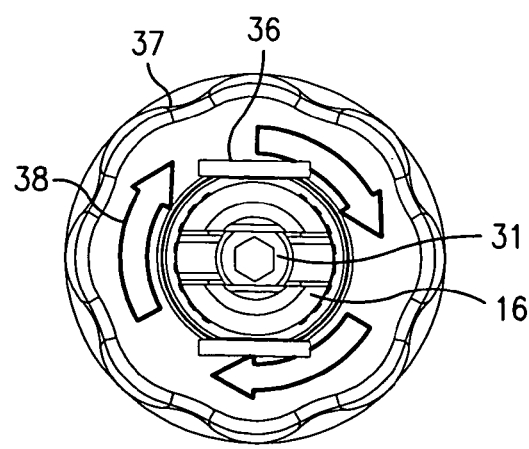
FIG. 8 shows the emergency lowering device of FIG. 6 seen from above.

An emergency lowering device 14 is secured to the forward end of the driving rod 11. With reference to FIGS. 3 and 4, the emergency lowering device includes a first cylindrical part 15 which carries a mounting bracket 16 for securing the forward end of the actuator. With a second cylindrical part 17 the emergency lowering device is secured to the end of the driving rod 11. A ball bearing 18 is mounted between the two parts by a screw. In addition to the two cylindrical parts 15, 17, an operating grip is provided in the form of a bushing 19 which, with an end wall 20 with a hole, is seated down over the mounting bracket 16 and is rotatably mounted on the upper side of the cylindrical part 15. A screw spring 21 is arranged slightly biased around the cylindrical part 15. An outwardly bent end 22 of the spring is secured in a longitudinal slot 24 in the bushing 19. The other end 23 of the spring is bent inwardly and is secured to the second cylindrical part 17 at the end of the driving rod 11. A pin 25 is secured in the side of the cylindrical part 17 and cooperates with the edge of a recess 26 in the bushing. The recess is in communication with the groove 24 for the other end 22 of the spring. The cylindrical part 17 is secured in the bushing with a safety ring 27, but might also be secured by a snap lock connection in the form of an annular bead at the same place on the cylinder, which engages below the cylindrical part 17. The cylindrical part 15 is secured axially by a safety ring 28 disposed below the bearing 18.

In case of a power failure, the bar 2 may be lowered manually by means of the emergency lowering device. When the operating grip 19 is turned clockwise, the end 22 is likewise turned clockwise, whereby the diameter of the spring increases, and the cylindrical part 15 is thereby released. The other end 23 of the spring is secured in the cylindrical part 17. Continued turning of the bushing causes the edge of the recess to be engaged with the pin 25. As the cylindrical part 15 with the mounting bracket 16 is released from the cylindrical part 17 at the end of the driving rod 11, this rotates together with the bushing and the nut is screwed inwards on the spindle, whereby the driving rod is pulled inwards and the bar 2 is lowered to its starting position. When the bushing 19 is released, the spring bias of the spring 21 will automatically ensure that the cylindrical part 15 with the mounting bracket 16 is connected.

FIGS. 5-9 of the drawing show a slightly different embodiment of the emergency lowering device. As the basic structure and the mode of operation are the same as before, the same reference numerals are used for the same components. The embodiment differs from the preceding one in that the bushing consists of outer and inner parts 19'a, 19'b. The inner part 19'b has three spring legs 28 with a foot 29 for cooperation with respective recesses 30 in the edge of the cylindrical part 17 to secure it by a snap lock effect. The recesses 30 are overdimensioned relative to the feet 29, so that the bushing may be rotated slightly for loosening the coupling spring 21 in the same manner as before. In order to adapt the friction of the coupling spring on the cylindrical part 15', its side wall is provided with a ribbed pattern 40 so that the area of the face with which the spring is engaged is not very large, and the friction force is thereby correspondingly smaller. For a given length of the spring, the friction force may thus be reduced with recesses in the engagement face. The bearing between the two cylindrical parts 15', 17 is a sliding bearing 18' here. The screw 31 just serves to prevent the cylindrical part 15' from being urged upwards, if the actuator is tensioned unintentionally. The outer part 19'a of the bushing is secured to the inner part 19'b in that the spring legs 28 on the outer side are provided with ribs 32, which cooperate with mating grooves 33 internally in the outer part 19'a and are secured by a snap lock in the form of a bead 34 in engagement with a constriction 35 at the bottom on the inner part 19'b. It is observed for the sake of good order that 36 designates two linings for the eye 35 in the mounting bracket 16. The outer side of the bushing 19' is pro-vided with a wave-shaped pattern 37 to provide a better grip for the hand, and, at the top, arrows 38 indicate the direction of rotation.

Figure 10:
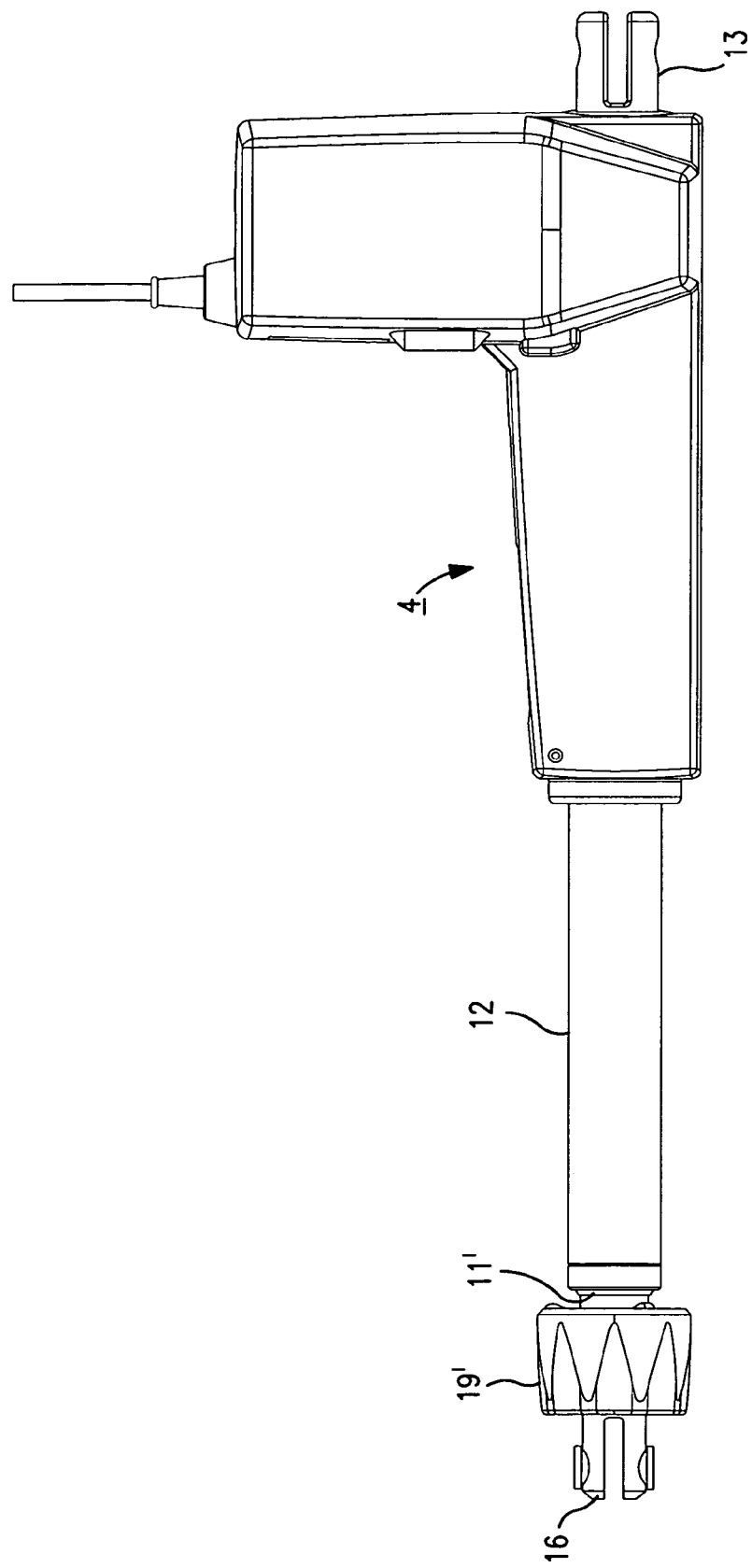
FIG. 10 shows a linear actuator equipped with the emergency lowering device of FIG. 6.

FIG. 10 shows an actuator of the type LA31 from the company LINAK A/S, of Denmark, provided with the emergency lowering device shown in FIGS. 5-9. The emergency lowering device is screwed into the end of the tubular driving rod 11' of the actuator by means of threads 39.

The invention claimed is:

1. An actuator which comprises:
   a rotatable spindle which has a forward end and a rear end,
   a spindle nut mounted on said spindle to move along said spindle between said forward and rear ends thereof upon rotation of said spindle,
   a reversible electric motor,
   a transmission interconnected between said motor and said rear end of said spindle to rotate said spindle,
   an activation rod attached to said spindle nut to extend towards and beyond said forward end of said spindle,
   a front mount for attachment to a movable part of an item of an apparatus, and
   an emergency retraction mechanism connected between the front mount and the activation rod, said emergency retraction mechanism comprising
   a first cylindrical part attached to the front mount,
   a second cylindrical part attached to the activation rod,
   a bearing located between said first and second cylindrical parts to enable rotative rotation therebetween,
   an operating handle around said first cylindrical part, and
   a coil spring around said first and second cylindrical parts, said coil spring having windings wrapped around and in contact with an outer periphery of said first cylindrical part, said coil spring having a first end which is bent outwardly and is attached to said operating handle and a second end which is bent inwardly and is connected to said second cylindrical part, manual rotation of said operating handle operating to expand the coil spring out of contact with said first cylindrical part to enable relative motion between the first and second cylindrical parts, and thereafter cause rotation of said spindle and retraction of said spindle nut towards said rear end of said spindle.

2. The actuator according to claim 1, wherein said operating handle includes an internal longitudinal recess and said first end of said coil spring extends into said recess.

3. The actuator according to claim 1, including cooperating carrier means connecting the operating handle with the second cylindrical part.

4. The actuator according to claim 3, wherein the carrier means comprise a protruding pin on the second cylindrical part cooperating with an edge of a recess in the operating handle.

5. The actuator according to claim 1, wherein the operating handle includes a longitudinal groove having a recess for the first end of the coil spring.

6. The actuator according to claim 1, wherein the operating handle comprises an outer and inner cylindrical part with coupling means.

7. The actuator according to claim 6, wherein coupling parts are formed by spring legs on the inner cylindrical part, said spring legs having a foot intended to cooperate with respective recesses in the edge of the second cylindrical part for snap lock connection.

8. The actuator according to claim 7, wherein the recesses are larger than the feet, so that the operating handle may be rotated for loosening the coil spring.

9. The actuator according to claim 1, including recesses in an engagement face of the first cylindrical part to reduce friction force.

10. The actuator according to claim 9, wherein the recesses are configured as a ribbed pattern transversely to turns of the coil spring.

* * * * *